Nov. 2, 1954  C. F. BALL  2,693,268
ENDLESS CHAIN CONVEYER
Original Filed April 19, 1949  2 Sheets-Sheet 1
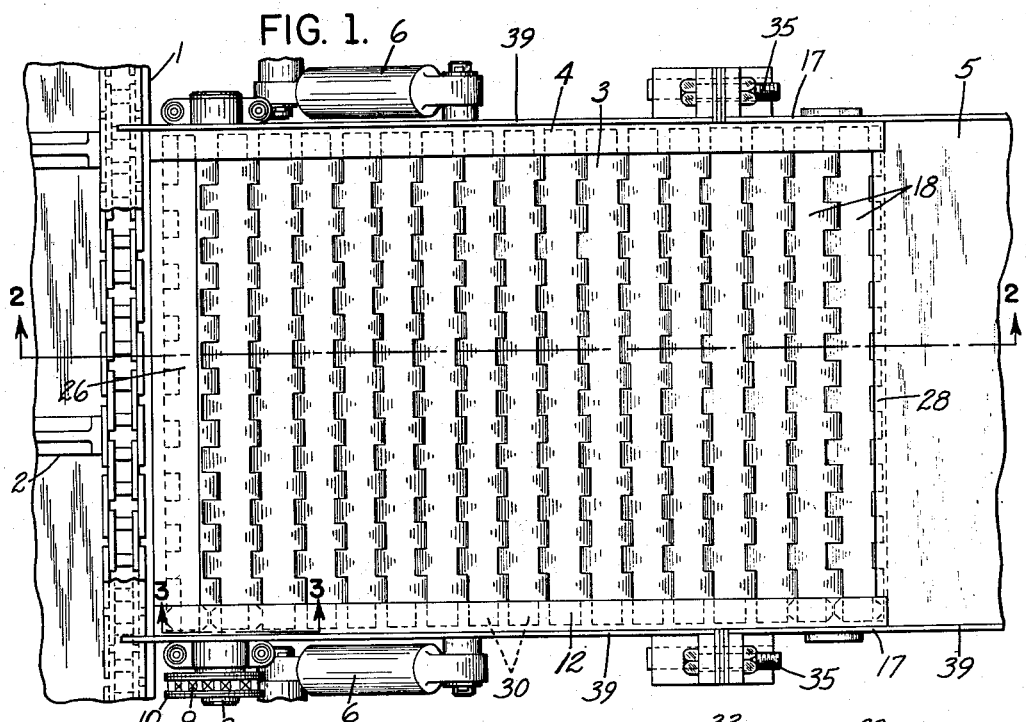
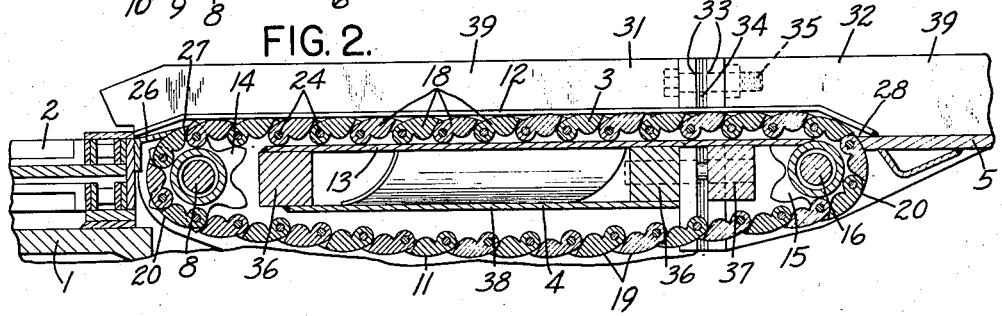
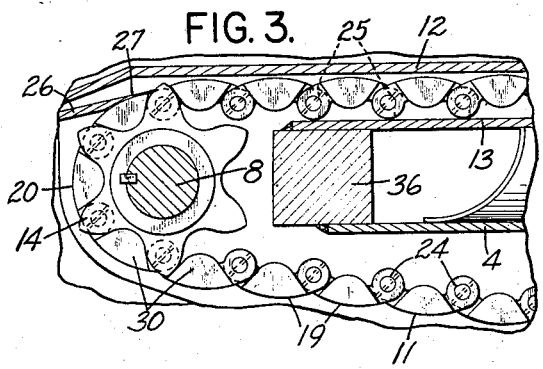
INVENTOR:
CHARLES F. BALL
BY Charles F. Osgood,
ATTORNEY

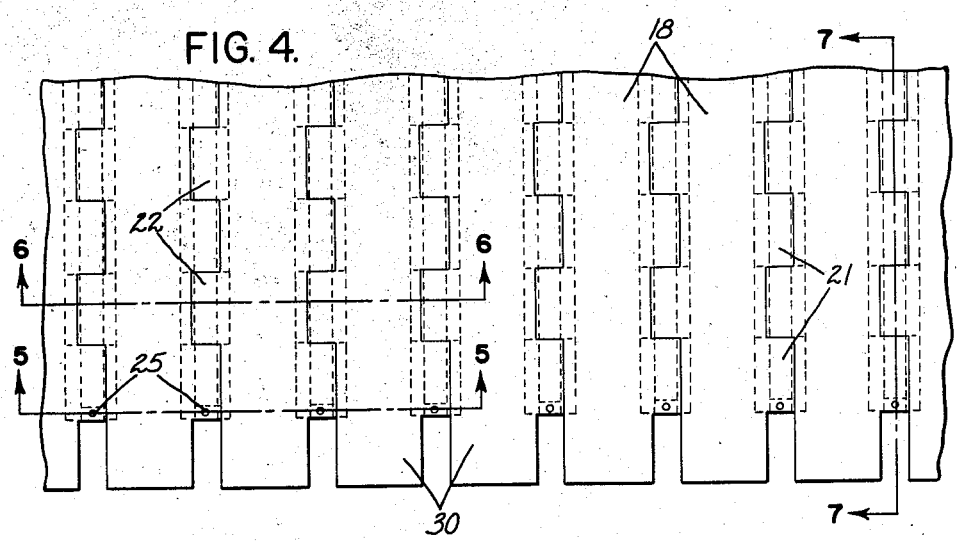
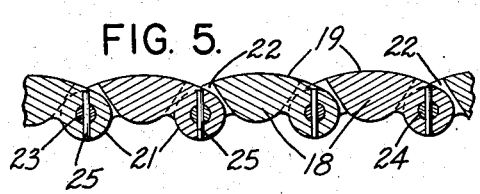
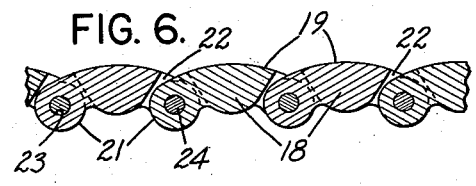
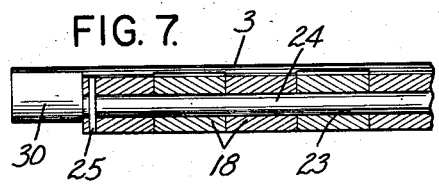
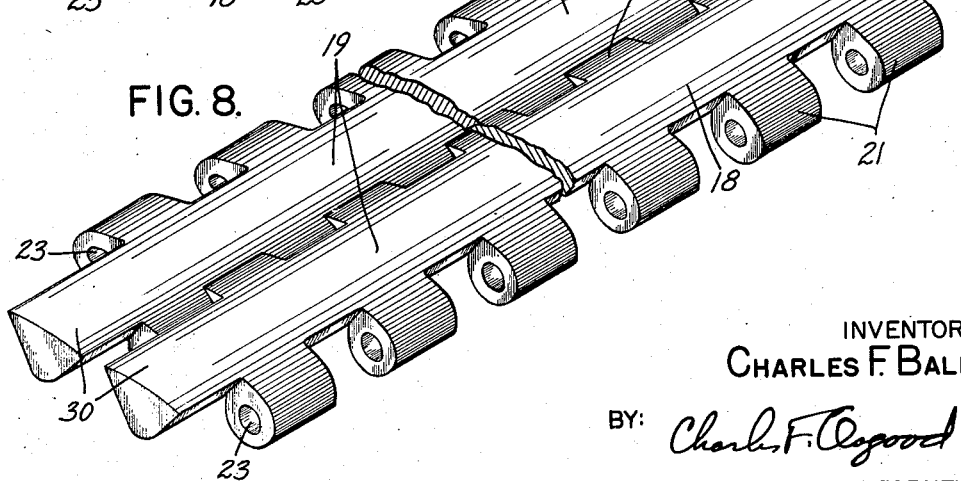
INVENTOR:
CHARLES F. BALL
ATTORNEY.

United States Patent Office 2,693,268
Patented Nov. 2, 1954

2,693,268

ENDLESS CHAIN CONVEYER

Charles F. Ball, Franklin, Pa., assignor to Joy Manufacturing Company, Pittsburgh, Pa., a corporation of Pennsylvania Original application April 19, 1949, Serial No. 86,516. Divided and this application March 1, 1951, Serial No. 213,365

6 Claims. (Cl. 198—65)

This invention relates to conveyors and more particularly to an endless chain conveyor.

In endless chain conveyors of known types and especially those used in conveying loose materials such as loose coal or the like in mines, it is practically impossible to deflect the material from the conveyor without clogging and resultant possible jamming and breakage. This is due to the relatively large spaces within the moving conveyor chain from which the deflector cannot effectively dislodge material and which permit the conveyor to move some of the material being conveyed beyond the deflector thereby resulting in such clogging and jamming. The present invention contemplates improvements over such known types of endless chain conveyors in that a relatively smooth conveyor surface is provided as the conveyor moves about its guiding means at its opposite ends whereby the material being conveyed may be deflected from the relatively smooth surface of the conveyor and discharged from the conveyor without clogging or jamming. The conveyor of the present invention is constructed in a novel manner and is arranged and driven so that a non-clogging, rugged and relatively vertically compact design is obtained, completely eliminating the inherent disadvantages which conventional chain conveyors frequently present. It is also possible with the conveyor of the present invention to discharge material onto an associated conveyor disposed at the same elevation with its discharge end so that the deflected material may pass directly from one conveyor to the other without gravity discharge or intervening conveying means.

An object of the present invention is to provide an improved endless chain conveyor. Another object is to provide an improved endless conveyor having novel features of construction, together with improved driving means for the conveyor chain. A further object is to provide an improved endless chain conveyor having deflector means associated therewith, together with improved interfitting conveyor elements which cooperate as they pass about their guiding means to provide a smooth conveyor surface with which the deflector means cooperates. A still further object is to provide an improved endless chain conveyor and cooperating deflector means whereby the conveyor may discharge onto an associated conveyor disposed at the same height without the intermediation of a gravity discharge or auxiliary conveying means. Another object is to provide an improved endless chain conveyor having novel features of construction. These and other objects and advantages of the invention will, however, hereinafter more fully appear in the course of the ensuing description.

This application is a division of my copending application, Serial No. 86,516, filed April 9, 1949.

In the accompanying drawings there is shown for purposes of illustration one form which the invention may assume in practice.

In these drawings:

Fig. 1 is a plan view of an endless chain conveyor constructed in accordance with a preferred illustrative embodiment of the invention.

Fig. 2 is a central longitudinal vertical section taken on line 2—2 of Fig. 1.

Fig. 3 is an enlarged detail vertical sectional view taken on line 3—3 of Fig. 1, showing one of the driving sprockets for the conveyor chain.

Fig. 4 is an enlarged fragmentary plan view of the conveyor.

Figs. 5 and 6 are detail vertical sectional views taken respectively on lines 5—5 and 6—6 of Fig. 4.

Fig. 7 is a detail cross sectional view taken on line 7—7 of Fig. 4, showing one of the hinge connections between the chain elements.

Fig. 8 is a perspective view of a pair of adjacent links of the conveyor chain.

In this illustrative construction, as shown in the drawings, a frame 1 carrying a horizontal transverse conveyor 2 has a longitudinal endless chain conveyor 3 associated therewith in a position to discharge thereon, as shown in Figs. 1 and 2. The conveyor 3 has a frame 4 mounted on the frame 1 to swing in vertical planes about a transverse pivot and has a front shovel or scraper 5 for directing loose material onto the outer receiving end of the conveyor 3. Extensible hydraulic jacks 6 connected between the frames 1 and 4 serve to swing the frame 4 about its pivot relative to the frame 1 and to hold the same in adjusted position. The conveyor 3 when in its horizontal position shown is disposed at substantially the same elevation as the conveyor 2.

Now referring to the improved endless chain conveyor 3 it will be noted that the latter comprises a transverse drive shaft 8 coaxial with the conveyor frame pivot, and to which a drive sprocket 9 (Fig. 1), driven by a motor driven chain 10, is secured. An endless conveyor chain 11 is guided for circulation in guideways provided by top flanges 12 of the pivoted frame 4, the latter desirably being of a fabricated welded construction. The top run of the conveyor is supported by and is adapted to travel along a top plate 13 of the conveyor frame; and is guided at its inner portion by drive sprockets 14 keyed to the drive shaft 8 and at its outer portion by idler sprockets 15 journaled on a transverse shaft 16 suitably supported at its ends within vertical side plates 17 of the conveyor frame. The conveyor chain is of a novel design whereby the material conveyed thereby may be effectively scraped off or deflected from the conveyor as the latter circulates within its guideways and about the chain sprockets 14 and 15, without the possibility of clogging and jamming. As illustrated, the conveyor chain 11 is of the closed link type comprising a series of elongated, relatively narrow cross links 18 pivotally connected directly together by continuous hinges, and the outer surfaces of the links are symmetrically curved at 19 so that as the links pass around the drive sprockets 14 and the idler sprockets 15, as shown in Fig. 3, substantially smooth, nearly semi-circular outer conveyor surfaces 20 are provided. Each chain link has a series of lugs 21 which closely interfit within spaces between corresponding lugs 22 on the next adjacent links and these lugs have openings 23 which, when disposed in registry, receive rod-like pintles or hinge pins 24 which are secured at their ends to the links by cross pins 25 fitted in openings in the links and passing through openings in the pintles (Fig. 5). A scraper plate or deflector 26 secured to the adjacent side of the transverse conveyor 2 has a knife edge 27 which lies closely to the adjacent curved surface 20 of the conveyor chain so that any material on the conveyor may be scraped off and deflected inwardly onto the transverse conveyor 2, thereby substantially precluding the possibility of a substantial portion of the material being conveyed past the deflector downwardly around the drive sprockets 14. A similar deflector 28 is provided close to the surface 20 at the outer receiving end of the conveyor, as shown in Fig. 2. The conveyor chain has symmetrical projections 30 and the drive and idler sprockets 14 and 15 are so arranged that their teeth engage these end projections in the manner shown in Fig. 3. Thus, the end projections constitute the driving elements of the conveyor chain and receive the driving forces imparted thereto by the drive sprockets 14. By the provision of such end drive projections 30 a conveyor having a smooth substantially uninterrupted upper conveyor surface, extending between the conveyor side plates, is attained, as shown most clearly in Fig. 1.

Each conveyor frame 4 is composed of inner and outer frame portions 31 and 32 having transverse adjacent plane surfaces 33 between which shims 34 may be interposed to vary the distance of separation of the surfaces 33. The frame parts are detachably secured together by bolts 35. By varying the amount of shimming between the adjacent surfaces of the frame parts the distance between the axes of the driving and idler sprockets 14 and 15 may be varied, thereby to vary the tension of the conveyor chain. The side plates 17 of the conveyor frame are laterally reinforced by transverse bars 36 and 37, the bars 36 extending between the side plate portions of the inner frame portion 31 and the bar 37 extending between the side plate portions of the outer frame portion 32. The upper plate 13 of the conveyor frame and a parallel bottom plate 38 are welded to the parallel bars 36. Thus, an extremely rugged and compact fabricated structure is obtained. The side frames of the frame portions 31 and 32 have upstanding side flanges 39 providing a troughlike structure whereby the material received on the conveyor from the front shovel 5 is directed rearwardly substantially without spillage toward the transverse conveyor 2. While the conveyor 3 is shown in a substantially horizontal position at substantially the same level as the conveyor 2, it will be evident that the conveyor 3 may be swung downwardly about its pivot into a position at a substantial angle with respect to the plane of the top surface of the conveyor 2, in the manner fully disclosed in the copending application referred to above.

As a result of this invention an improved endless chain conveyor is provided which is substantially non-clogging and from which the material being conveyed may be deflected onto an associated conveyor disposed at substantially the same elevation without the intermediation of a gravity chute or auxiliary conveyor mechanism. By the provision of the improved chain link structure a substantially smooth conveyor surface is provided whereby the material may be readily deflected from the conveyor chain as the latter passes around its driving and guiding sprockets. The novel chain link design with the driver-portions arranged at the ends of the links at the opposite sides of the conveyor enables a novel engagement of the chain sprockets with the chain, resulting in a structure which is not only extremely rugged in design but which is also relatively vertically compact. These and other advantages of the invention will be clearly apparent to those skilled in the art.

While there is in this application specifically described one form which the invention may assume in practice, it will be understood that this form of the same is shown for purposes of illustration and that the invention may be modified and embodied in various other forms without departing from its spirit or the scope of the appended claims.

What I claim as new and desire to secure by Letters Patent is:

1. In an apparatus of the character disclosed, a frame, an endless conveyor chain comprising a series of articulated closed-link members having symmetrically curved outer surfaces and arranged in close, side by side, parallel relation along the length of the chain, said link members having interfitting lugs provided with registering openings for receiving rod-like pintles to provide elongated hinge connections between said link members with said connections arranged coextensive with the conveying portions thereof, said link members cooperating to provide a wide substantially unbroken outer surface on which the material to be conveyed is received, said link members having their outer ends projecting longitudinally beyond the ends of said hinge connections with the outer surfaces of said ends lying within the projected curvature of the outer conveying surfaces of said link members, rotary guides about which the conveyor chain passes at the discharge end of said conveyor, said guides engaging the ends of said link members at the opposite sides of said chain beyond the ends of said hinge connections, and said link members intermediate their guide-engaging-ends cooperating to provide a substantially semi-circular, substantially unbroken smooth outer surface lying in the surface of a cylinder as they pass around said guides, and deflector means cooperating with said conveyor and located at the discharge end of said conveyor for deflecting material from said smooth semicircular surface thereby to prevent material from being conveyed in substantial amount by said conveyor downwardly past said deflector means.

2. In an apparatus of the character disclosed, a closed link conveyor chain comprising a series of elongated interfitting links arranged in close, side by side, parallel relation along the length of the chain and pivotally connected together to provide hinge connections coextensive with the conveying portions of said links and cooperating to provide a wide, closed-top surface on which the material to be conveyed is received, said links having integral projecting ends at the sides of said closed top conveying surface with said ends projecting longitudinally of said links beyond said hinge connections at the sides of the chain, and drive sprockets about which said conveyor chain passes and having sprocket teeth engaging said projecting ends of said links for driving said conveyor chain, said projecting ends shaped for engagement by the sprocket teeth with the latter projecting between the ends of adjacent links.

3. An endless chain conveyor comprising cooperating elongated, relatively narrow, conveyor links arranged in close, side by side, parallel relation along the length of the chain and providing a conveyor having a substantially continuous substantially unbroken top surface of substantial width, said links having interfitting lugs provided with aligned openings, hinge pins fitting said openings for pivotally connecting said links together, said interfitting lugs and said hinge pins cooperating to provide hinge connections extending substantially the entire length of the conveying portions of said links, said links having integral end projections extending outwardly beyond the outermost lugs wholly outside of the remote ends of said hinge connections, and coaxial driving sprockets having their axes lying within the orbit of said chain and drivingly engaging said projecting ends of said links, said end projections shaped to coperate with the teeth of said driving sprockets with the sprocket teeth projecting between the end projections of adjacent links.

4. An endless chain conveyor of the character set forth in claim 3 wherein said links have symmetrically curved outer surfaces which cooperate as they pass around said sprockets to provide substantially semicircular smooth surfaces lying in the surface of a cylinder intermediate said integral end projections, and deflectors at the ends of said conveyor cooperating with said smooth curved surfaces for deflecting material from the conveyor.

5. In a conveyor mechanism, the combination comprising an endless closed-link conveyor chain including a series of hingedly connected link members arranged in close side by side parallel relation along the length of the chain, said link members cooperating to provide a wide substantially unbroken outer surface which at the top run of the chain receives the material to be conveyed, said link members having symmetrically curved outer surfaces, hinge connections between said link members arranged coextensive with the adjacent edges of the conveying portions thereof for pivotally connecting said link members together, and guiding means located only at the sides of said conveyor chain and about which said conveyor chain passes, the outer curved surface of each link member lying in a surface of a cylinder and each of said curved partially cylindrical surfaces at the top run of the chain extending arcuately completely to its lines of intersection with oppositely adjacent link members, said outer curved surfaces of said link members as said conveyor chain passes along an arc of a circle about said guiding means cooperating to provide a substantially semi-circular smooth outer surface lying in the surface of a cylinder, said guiding means comprising coaxial drive sprockets, said chain having imperforate projecting end portions laterally of said substantially unbroken outer conveying surface with which the teeth of said sprockets cooperate, said sprockets arranged with their aligned axes lying within the orbit of said chain, said projecting end portions of said link members shaped to lie between the teeth of said driving sprockets and to conform with the sprocket contour, with a pair of sprocket teeth projecting between the projecting end portions of adjacent link members.

6. In a conveyor mechanism, the combination comprising an endless closed-link conveyor chain including a series of hingedly connected link members arranged in close side by side parallel relation along the length of the chain, said link members cooperating to provide a wide substantially unbroken outer surface which at the top run of the chain receives the material to be conveyed, said link members having symmetrically curved outer surfaces, hinge connections between said link members arranged coextensive with the adjacent edges of the conveying portions thereof for pivotally connecting said link members together, the outer curved surface of each link member lying in a surface of a cylinder and each of said curved partially cylindrical surfaces at the top run of the chain extending arcuately completely to its lines of intersection with oppositely adjacent link members, said outer curved surfaces of said link members as said conveyor chain passes along an arc of a circle at the end portions of the conveyor mechanism cooperating to provide a substantially semi-circular smooth outer surface lying in the surface of a cylinder, said link members having imperforate projecting end portions laterally of said substantially unbroken outer conveying surfaces, said projecting end portions shaped to conform and to cooperate with driving means located only at the sides of said conveyor chain.

References Cited in the file of this patent

UNITED STATES PATENTS

| Number | Name | Date |
| --- | --- | --- |
| 423,069 | Miller | Mar. 11, 1890 |
| 525,526 | Anderson | Sept. 4, 1894 |
| 614,847 | Dick | Nov. 29, 1898 |
| 1,224,445 | Burpee | May 1, 1917 |
| 1,330,116 | Hunt | Feb. 10, 1920 |
| 2,180,284 | Meyer | Nov. 14, 1939 |
| 2,351,801 | Baumann | June 20, 1944 |
| 2,587,959 | Biner | Mar. 4, 1952 |